(12) United States Patent
Ohkawa et al.

(10) Patent No.: US 10,513,176 B2
(45) Date of Patent: Dec. 24, 2019

(54) VEHICLE TRANSFER STRUCTURE

(71) Applicant: Mazda Motor Corporation, Aki-gun, Hiroshima (JP)

(72) Inventors: Yuzo Ohkawa, Hiroshima (JP); Eiji Mito, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 192 days.

(21) Appl. No.: 15/866,747

(22) Filed: Jan. 10, 2018

(65) Prior Publication Data

US 2018/0257487 A1 Sep. 13, 2018

(30) Foreign Application Priority Data

Mar. 10, 2017 (JP) .................................. 2017-045651

(51) Int. Cl.
*B60K 17/346* (2006.01)
*B60K 23/08* (2006.01)
(Continued)

(52) U.S. Cl.
CPC ...... *B60K 17/3462* (2013.01); *B60K 23/0808* (2013.01); *F16D 13/52* (2013.01);
(Continued)

(58) Field of Classification Search
CPC ............ B60K 17/34–358; B60K 23/08; B60K 23/0808; B60K 2023/0816–0891; F16H 2048/02; F16H 2048/04; F16D 7/00–10
See application file for complete search history.

(56) References Cited

U.S. PATENT DOCUMENTS 5,106,351 A * 4/1992 Williams ........... B60K 17/3467
475/250
2017/0028845 A1 2/2017 Ohkawa et al.

FOREIGN PATENT DOCUMENTS

JP S60126756 U 8/1985
JP H326832 U 3/1991
(Continued)

OTHER PUBLICATIONS

Japanese Patent Office, Office Action Issued in Application No. 2017045651, dated Aug. 21, 2018, 6 pages. (Submitted with Machine Translation).

*Primary Examiner* — David R Morris
*Assistant Examiner* — James J Taylor, II
(74) *Attorney, Agent, or Firm* — Alleman Hall Creasman & Tuttle LLP

(57) ABSTRACT

A vehicle transfer structure includes a main-drive-wheel output shaft that receives torque from a drive source and outputs it to main drive wheels, a part-time-drive-wheel output shaft provided parallel to the main-drive-wheel output shaft, a coupling provided on the main-drive-wheel output shaft and which partially extracts the torque to the part-time-drive-wheel output shaft via a transmission mechanism, and a damper disposed on the main-drive-wheel output shaft. The coupling is provided with an input-side coupling part coupled to an inner circumferential part of the damper. The input-side coupling part is coupled, via a spline-fitted section, to an output-side coupling part of a drive force transmission member which is coupled to an outer circumferential part of the damper and transmits a drive force to a driving-side transmission member of the transmission mechanism. The spline-fitted section allows a relative rotation between the input- and output-side coupling parts within a given angle.

5 Claims, 8 Drawing Sheets

(51) Int. Cl.
*F16D 13/52* (2006.01)
*F16H 48/22* (2006.01)
*F16D 27/00* (2006.01)
*F16F 15/124* (2006.01)

(52) U.S. Cl.
CPC ........ *F16D 27/004* (2013.01); *F16D 2300/22* (2013.01); *F16F 15/1245* (2013.01); *F16H 48/22* (2013.01)

(56) References Cited

FOREIGN PATENT DOCUMENTS

| | | |
|---|---|---|
| JP | 2009257432 A | 11/2009 |
| JP | 2016150594 A | 8/2016 |
| JP | 201730452 A | 2/2017 |

\* cited by examiner

VEHICLE TRANSFER STRUCTURE

TECHNICAL FIELD

The present disclosure relates to a transfer structure mounted on a four-wheel drive vehicle.

BACKGROUND OF THE DISCLOSURE

Four-wheel drive vehicles having the following configuration are known. A drive source (e.g., an engine) and a transmission are disposed in a front part of a vehicle body so that their axes extend in vehicle front-and-rear directions. A transfer device is provided for outputting torque of the drive source. The torque is transmitted from an output part of the transmission to rear wheels (main drive wheels) of the vehicle via a rearwardly-extended rear-wheel propeller shaft and a rear-wheel differential. The transfer device also extracts a portion of the output torque to be outputted to front wheels (part-time drive wheels) of the vehicle. The portion of the output torque extracted by the transfer device (front torque) is outputted to the front wheels via a forwardly-extended front-wheel propeller shaft and a front-wheel differential. Thus, in addition to the rear wheels, the front wheels are also drivable.

In this kind of four-wheel drive vehicle, a coupling for extracting the front torque is disposed in the transfer device. By completely engaging the coupling, the vehicle enters into a four-wheel drive state where the output torque is transmitted to the front and rear wheels evenly. By completely releasing the coupling, the vehicle enters into a two-wheel drive state where the output torque is transmitted only to the rear wheels. When the engagement state of the coupling is between the complete engagement and the complete release, the torque distribution to the front wheels is adjusted according to the engagement state. For example, JP2009-257432A discloses such a transfer device.

The transfer device of JP2009-257432A is provided with a coupling which extracts front torque, on an input shaft where an output torque of a drive source is transmitted from an output part of a transmission. The front torque extracted by the coupling is transmitted via a transmission mechanism to a front-wheel output shaft provided in parallel to the input shaft, and thus, front wheels are drivable in addition to rear wheels. The transmission mechanism includes a master sprocket provided on the input shaft, a slave sprocket provided on the front-wheel output shaft, and a chain wound around both sprockets.

In the four-wheel drive vehicle mounted with such a transfer device, especially when the drive source is an engine, a variation in the output torque of the engine is transmitted to the transfer device via the transmission. When the front torque, which is extracted by the coupling, is zero or relatively small, a drivetrain on the front wheels side (front-wheel drivetrain) vibrates greatly due to the drivetrain resonating with the torque variation of the engine, which may cause a teeth rattling noise between gears provided in the drivetrain.

To reduce this vibration, within an operating range where the drivetrain resonates with the torque variation of the output torque of the engine, the torque distribution to the front wheels by the coupling may be increased so as to apply a load on the drivetrain and increase the front torque. Thus, the teeth rattling noise is reduced. However, this manner results in increasing a drive loss and fuel consumption, and therefore, it is desirable to reduce the rattling noise caused by the resonance of the drivetrain, without increasing the torque distribution to the front wheels.

In this regard, a damper may be disposed between the coupling provided on the input shaft which receives an output of the transmission, and driving-side transmission members (e.g., the sprockets and gears of the transmission mechanism for outputting the torque to a part-time-drive-wheel output shaft). However, when high torque is frequently transmitted from the coupling to the transmission mechanism via the damper, an elastic member of the damper deteriorates and damper durability degrades. Although it may be considered to enhance the rigidity of the elastic member of the damper in order to improve the damper durability, the vibration of the drivetrain cannot suitably be reduced in this manner, and the problem of the teeth rattling noise cannot be solved effectively.

Therefore, the present applicant has proposed, in a prior application (JP2015-191827), an invention of a transfer device which reduces the teeth rattling noise between gears in a drivetrain without increasing fuel consumption and improves damper durability, by providing a damper between a coupling and a drive gear.

Here, the transfer device of the prior invention is described with reference to FIG. 8 accompanying the present disclosure. The transfer device of the prior invention focused on that the teeth of the gears in the drivetrain easily make the rattling noise when a front torque which is extracted by a coupling C is relatively low. The transfer device transmits a drive force to a drive gear G of a transmission mechanism via a damper D only when the torque extracted by the coupling C is low, and transmits the drive force to the drive gear G directly from the coupling C without passing through the damper D when the torque is high.

The transfer device includes the drive gear G and the coupling C on an input shaft O which receives an input from a transmission, and is also provided with the damper D between the drive gear G and the coupling C. A main body C1 (an output member of the coupling C) is provided with a first cylindrical coupling part C2 extending toward the drive gear and a second cylindrical coupling part C3 further extending from the first coupling part C2 toward the drive gear G. An outer circumferential surface of the first coupling part C2 and an inner circumferential surface of an inner cylindrical member D1 of the damper D are coupled to each other via a first spline-fitted section S1. The drive gear G is provided with an extension part G1 extending toward the coupling C, and an inner circumferential surface of the extension part G1 and an outer circumferential surface of the second coupling part C3 of the coupling C are coupled to each other via a second spline-fitted section S2.

Further, an outer cylindrical member D2 of the damper D is coupled to a drive force transmission member P. This drive force transmission member P is provided with a cylindrical part P1 extending toward the drive gear and this cylindrical part P1 is fitted to an outer circumferential surface of the extension part G1 of the drive gear G.

Here, a backlash between teeth on the outer circumferential surface of the first coupling part C2 of the coupling C and teeth on the inner circumferential surface of the inner cylindrical member D1 of the damper D, which constitute the first spline-fitted section S1, is set small. Thus, a relative rotation between the coupling C and the damper D is zero or substantially zero. On the other hand, the backlash between teeth on the outer circumferential surface of the second coupling part C3 of the coupling C and teeth on the inner circumferential surface of the extension part G1 of the drive gear which constitute the second spline-fitted section S2, is set large. Thus, a relative rotation between the coupling C and the drive gear G is allowed within a given rotational angle.

With such a structure of the transfer device, when the front torque extracted by the coupling C is lower than a given value, deformation of an elastic member D3 of the damper D is small and a relative rotation of the outer cylindrical member D2 to the inner cylindrical member D1 is small. Therefore, in the second spline-fitted section S2 with large backlash, the teeth at the extension part G1 side of the drive gear G do not contact with the teeth at the second coupling part C3 side of the coupling C, and no torque is transmitted. Therefore, the front torque is transmitted from the coupling C to the drive gear G via the first spline-fitted section S1, the damper D, and the drive force transmission member P.

On the other hand, when the front torque extracted by the coupling C is higher than the given value, the deformation of the elastic member D3 of the damper D is large and the relative rotation of the inner cylindrical member D1 to the outer cylindrical member D2 is large. Therefore, also in the second spline-fitted section S2 with large backlash, the teeth on the inner circumferential surface of the extension part G1 contact the teeth on the outer circumferential surface of the second coupling part C3, and torque is transmitted. Therefore, the front torque is transmitted from the coupling C to the drive gear G via the first spline-fitted section S1, the damper D, and the drive force transmission member P, as well as partially transmitted to the drive gear G via the second spline-fitted section S2 which is the spline-fitted section between the coupling part C3 of the coupling C and the drive gear G.

Here, the second spline-fitted section S2 functions as a stopper mechanism which restricts the relative rotation amount of the inner cylindrical member D1 to the outer cylindrical member D2 of the damper D, so that an application of torque higher than the given value to the damper D is avoided. For this, the teeth rattling noise needs to be reduced while preventing an increase in fuel consumption, and the damper durability needs to be secured.

In this regard, since the second spline-fitted section S2 is provided on the drive gear G side in the transfer device illustrated in FIG. 8, the second coupling part C3 of the coupling C needs to be extended close to the drive gear G. For this, a multi-layer structure is provided in which the second coupling part C3 is disposed between the damper D and the drive gear G to overlap, in radial directions of the transfer device, with the structure in which the outer cylindrical member D2 of the damper D and the drive gear G are coupled using the drive force transmission member P. As a result, the size of the transfer device in the radial directions may increase. Therefore, it is desired to downsize the transfer device in order to improve mountability and ride comfort of the vehicle.

SUMMARY OF THE DISCLOSURE

Therefore, the present disclosure aims to provide a transfer structure, which is mounted on a four-wheel drive vehicle and prevents a size increase of a transfer device while providing a damper to reduce the teeth rattling noise without increasing fuel consumption, and while improving durability of the damper.

According to one aspect of the present disclosure, a vehicle transfer structure is provided, which includes a main-drive-wheel output shaft configured to receive torque from a drive source and output the torque to main drive wheels, a part-time-drive-wheel output shaft provided in parallel to the main-drive-wheel output shaft, a coupling provided on the main-drive-wheel output shaft and configured to extract a portion of the torque and output it to the part-time-drive-wheel output shaft via a transmission mechanism, and a damper disposed on the main-drive-wheel output shaft between the coupling and the transmission mechanism. The coupling is provided with an input-side coupling part having a cylindrical shape, extending toward the transmission mechanism, and coupled to an inner circumferential part of the damper via a first spline-fitted section. The input-side coupling part of the coupling is coupled, via a second spline-fitted section, to an output-side coupling part of a drive force transmission member coupled to an outer circumferential part of the damper and configured to transmit a drive force to a driving-side transmission member of the transmission mechanism, the output-side coupling part having a cylindrical shape and extending toward the coupling, the second spline-fitted section allowing a relative rotation between the input-side coupling part and the output-side coupling part within a given angle. The first and second spline-fitted sections are provided on an inner circumferential side of the damper, adjacently to each other in an axial direction of the main-drive-wheel output shaft.

Thus, when the torque transmitted from the coupling to the transmission mechanism side is small, the torque is transmitted from the input-side coupling part, which is provided to the coupling, via the first spline-fitted section, the damper and the drive force transmission member. When the torque is large, the angle of the relative rotation between an inner cylindrical member and an outer cylindrical member of the damper increases to bring the second spline-fitted section into a torque transmittable state. Therefore, a part of the torque is transmitted from the input-side coupling part, which is provided to the coupling, directly to the output-side coupling part, which is provided to the drive force transmission member, via the second spline-fitted section without passing through the damper.

Thus, the second spline-fitted section functions as a stopper mechanism configured to regulate the relative rotation amount of the damper, and a torque input higher than a given value to the damper is prevented.

Therefore, while the damper reduces the teeth rattling noise without increasing fuel consumption, durability of the damper is secured.

Moreover, particularly with the configuration, the first and second spline-fitted sections are formed on the main-drive-wheel output shaft, adjacent to each other in the axial direction. Therefore, the structure coupling the outer circumferential part of the damper to the driving-side transmission member of the transmission mechanism to transmit the torque from the damper to the transmission mechanism is disposed, in the axial direction of the drive force transmission member, opposite from the structure constituting the second spline-fitted section. Thus, the structure between the damper and the driving-side transmission member of the transmission mechanism is simplified. As a result, a size increase of a transfer device in a radial direction which is caused by the two structures overlapping in the radial direction of the damper is prevented, and further the transfer device is downsized. The effect becomes remarkable particularly when an oil seal, a bearing, etc. is disposed between the damper and the transmission mechanism.

With the transfer structure, the drive force transmission member may have a cylindrical part extending toward the transmission mechanism. A tip end portion of the cylindrical part may be coupled to a cylindrical extension part (input part) provided to the driving-side transmission member of the transmission mechanism and extending toward the coupling. A seal member attached to a transfer case may be disposed at a root end side of the cylindrical part.

As described above, the first and second spline-fitted sections are provided on the inner circumferential side of the damper, adjacently to each other in the axial direction of the main-drive-wheel output shaft. Thus, only the cylindrical part of the drive force transmission member and the input part of the driving-side transmission member, which are coupled to each other, exist between the damper and the driving-side transmission member of the transmission mechanism. The seal member is disposed to the root end of the cylindrical part to which the input part is not coupled. Therefore, the radius of a lip part of the seal member in contact with the cylindrical part is reduced and a sliding speed on the lip part is reduced. As a result, durability of the seal member improves.

With the transfer structure, the drive force transmission member may be coupled to the outer circumferential part of the damper by using a bolt.

With the configuration, the drive force transmission member is coupled to the outer circumferential part of the damper by using the bolt. Therefore, rattling of the damper is reduced and the damping performance is improved, and further, a teeth rattling noise between gears in a drivetrain is reduced more reliably, compared to a case where the outer circumferential part and the drive force transmission member are coupled in manner of spline-fitting, etc.

With the transfer structure, an inner cylindrical member constituting the inner circumferential part of the damper may be formed with an inner-cylindrical-side protrusion protruding outwardly. An outer cylindrical member constituting the outer circumferential part of the damper may be formed with an outer-cylindrical-side protrusion protruding inwardly. An elastic member may be sandwiched between the inner-cylindrical-side protrusion and the outer-cylindrical-side protrusion. The outer-cylindrical-side protrusion may be provided with a fastening section for the bolt that couples the outer circumferential part of the damper to the drive force transmission member.

With the configuration, the elastic member of the damper is sandwiched between the inner-cylindrical-side protrusion and the outer-cylindrical-side protrusion, and the outer-cylindrical-side protrusion is provided with the fastening section for the bolt that couples the outer circumferential part of the damper to the drive force transmission member. Thus, since the outer circumferential part of the damper and the drive force transmission member are coupled by using the inward protrusion of the outer circumferential part of the damper, coupling sections dedicated for coupling the outer circumferential part of the damper to the drive force transmission member are not separately required.

With the transfer structure, a seal member may be provided between the first and second spline-fitted sections and the inner circumferential part of the damper to prevent entrance of lubrication oil from the first and second spline-fitted sections into the damper side.

With the configuration, the seal member which prevents entrance of the lubrication oil from the first and second spline-fitted sections into the damper side is provided between the first and second spline-fitted sections and the inner circumferential part of the damper. Thus, a sealing function is provided between the first and second spline-fitted sections and the elastic member, and, while supplying the lubrication oil to the spline-fitted section which requires lubrication, the entrance of the lubrication oil into the elastic member is prevented. Therefore, the elastic member does not come in contact with the lubricant oil and thus there is no restriction for the material of the elastic member.

DETAILED DESCRIPTION OF THE DISCLOSURE

Hereinafter, a transfer device of a vehicle according to the present disclosure is described in detail for each embodiment.

First Embodiment

Figure 1:
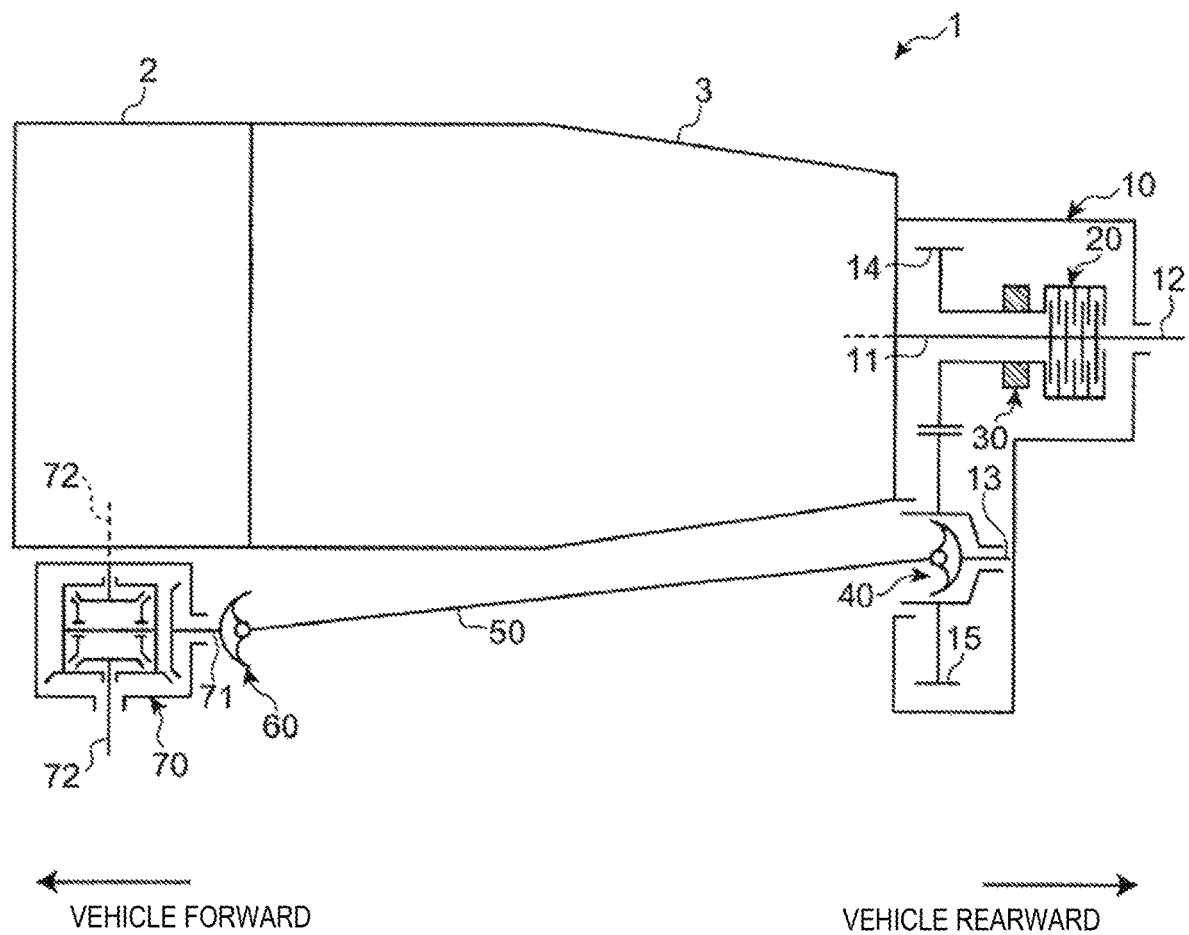
FIG. 1 is a schematic view illustrating a drive force transmission mechanism of a four-wheel drive vehicle on which a transfer device according to a first embodiment of the present disclosure is mounted.

As illustrated in FIG. 1, the four-wheel drive vehicle 1 on which the transfer device according to a first embodiment is mounted is a four-wheel drive vehicle of a front-engine, rear-wheel drive base. The vehicle 1 includes an engine 2 (drive source) and a transmission 3 which are arranged in a front part of a vehicle body so that axes thereof extend in front-and-rear directions of the vehicle body (hereinafter, the front direction of the vehicle body may simply be referred to as "the front side" or "forward" and the rear direction of the vehicle body may simply be referred to as "the rear side" or "rearward").

A transfer device 10 is disposed rearward of the transmission 3 and outputs torque of the engine 2 transmitted from an output part of the transmission 3, to rear wheels (main drive wheels) via a rear-wheel propeller shaft extending rearwardly and a rear-wheel differential. The transfer device 10 also extracts a portion of the output torque for front wheels (part-time drive wheels).

The transfer device 10 includes an input shaft 11, a rear-wheel output shaft 12, and a front-wheel output shaft 13. The input shaft 11 receives the output torque of the engine 2 at the front side (one side of an axial direction of the input shaft 11). The rear-wheel output shaft 12 is provided rearward of the input shaft 11 (the other side of the axial direction of the input shaft 11) and outputs the output torque of the engine 2 to the rear wheels. The front-wheel output shaft 13 is arranged in parallel to the rear-wheel output shaft 12, and outputs the output torque of the engine 2 to the front wheels. In this embodiment, the rear-wheel output shaft 12 is provided coaxially to the input shaft 11, is coupled to the input shaft 11, and outputs the output torque of the engine 2 to the rear wheels.

The transfer device 10 also includes a coupling 20, a master gear 14, and a damper 30. The coupling 20 is provided on the rear-wheel output shaft 12 and coupled to the rear-wheel output shaft 12. The master gear 14 (driving-side transmission member) is provided forward of the coupling 20 and constitutes a transmission mechanism configured to transmit the output torque of the engine extracted by the coupling 20 to the front-wheel output shaft 13. The damper 30 is provided between the coupling 20 and the master gear 14. Further, a slave gear 15 (driven-side transmission member) is provided on the front-wheel output shaft 13, is fitted to the master gear 14, and constitutes the transmission mechanism.

In this embodiment, the coupling 20 adopts an electromagnetic coupling to extract a portion of the output torque of the engine 2 to be outputted to the front wheels. The portion of the output torque of the engine 2 extracted by the coupling 20 (hereinafter, may simply referred to as "front torque") is transmitted to the front-wheel output shaft 13 via the slave gear 15 meshing with the master gear 14.

The front-wheel output shaft 13 is coupled, via a universal joint 40, to a front-wheel propeller shaft 50 extending forwardly. The front-wheel propeller shaft 50 is coupled to an input shaft 71 of a front-wheel differential 70 via a universal joint 60, and the input shaft 71 is coupled to drive axles 72 coupled to the left and right front wheels, respectively.

Thus, the front torque extracted by the coupling 20 is transmitted to the front-wheel output shaft 13 via the master gear 14 and the slave gear 15, and further transmitted from the front-wheel output shaft 13 to the front wheels via the front-wheel propeller shaft 50 and the front-wheel differential 70. In the four-wheel drive vehicle 1, the coupling 20 is changeable of a ratio of the torque distribution to the front wheels and the rear wheels within a range between 0:100 and 50:50 (front wheels:rear wheels). Note that the operation of the coupling 20 is controlled by a control unit (not illustrated).

Figure 2:
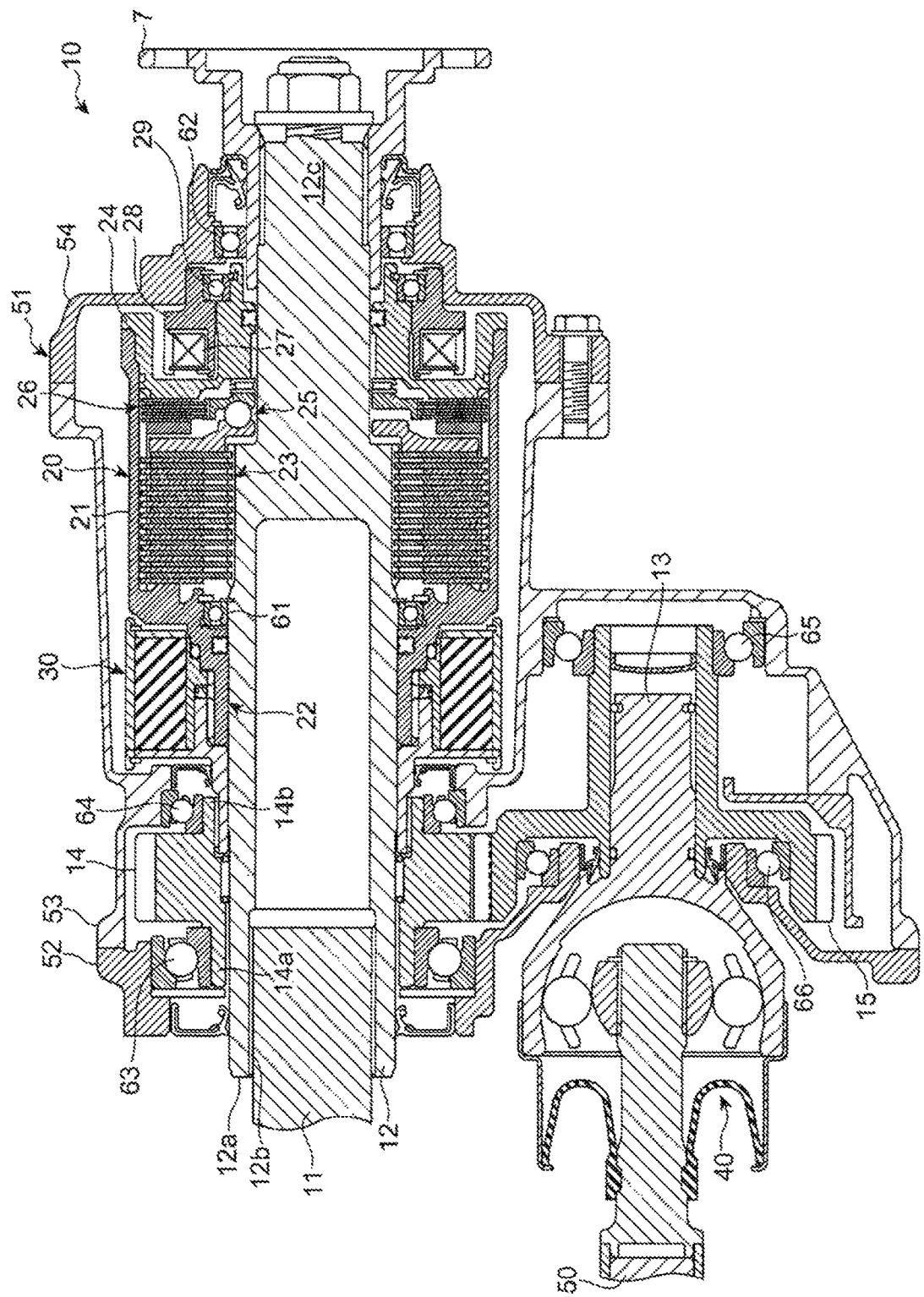
FIG. 2 is a cross-sectional view of the transfer device.
Figure 3:
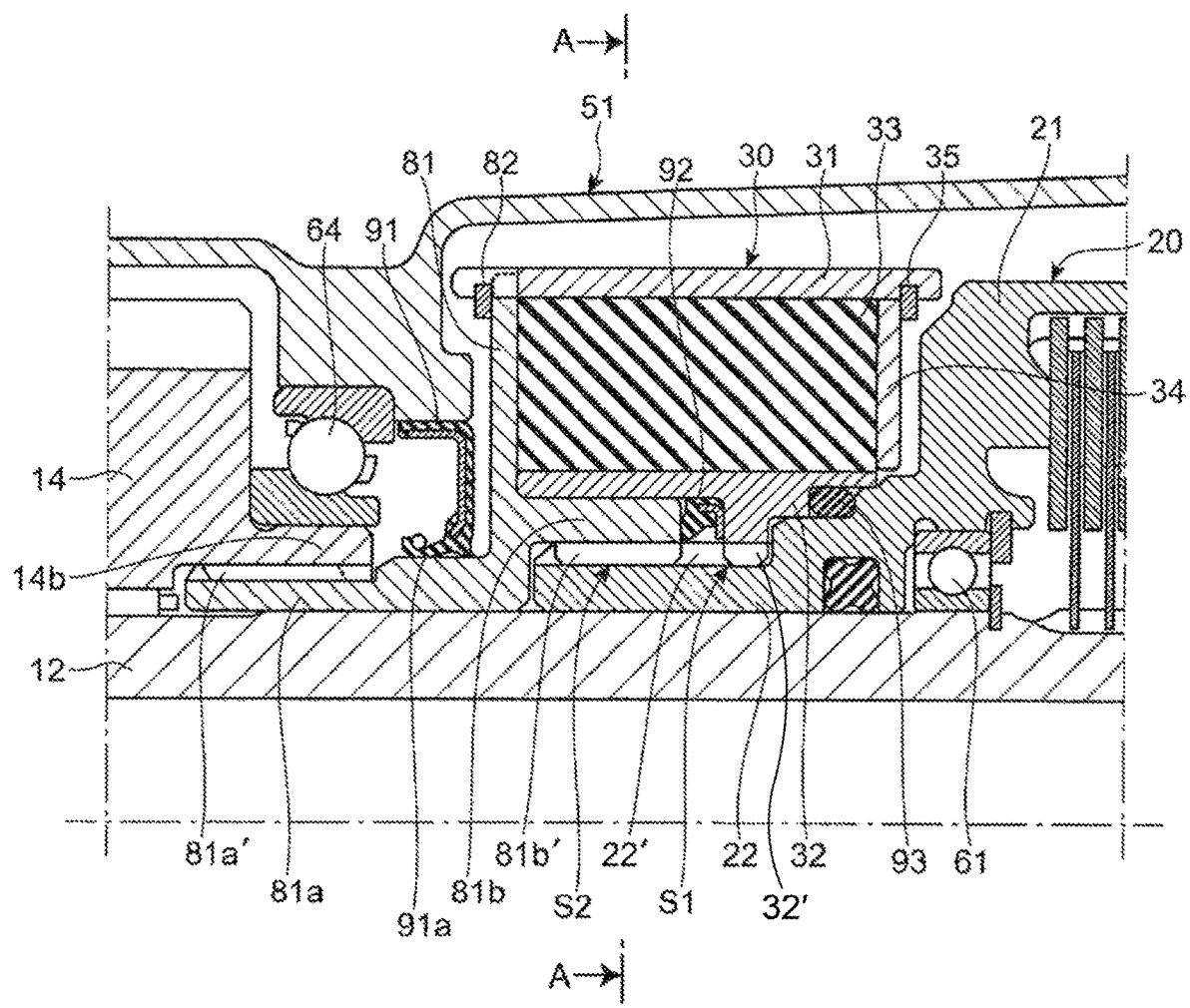
FIG. 3 is an enlarged view of a main part of the transfer device.

Next, the transfer device 10 of this embodiment is described more in detail with reference to FIGS. 2 and 3.

The rear-wheel output shaft 12 coupled to the input shaft 11 which receives the output of the transmission 3, and the front-wheel output shaft 13 disposed in parallel to the rear-wheel output shaft 12 are supported inside a transfer case 51 to be rotatable.

The rear-wheel output shaft 12 has a recessed section 12b in a front end part 12a and is spline-fitted to the input shaft 11 which is inserted into the recessed section 12b, so as to rotate together with the input shaft 11. The rear-wheel output shaft 12 is coupled to a coupling member 7 by being spline-fitted thereto at a rear end part 12c, and is rotatably supported to the coupling 20 and the transfer case 51 via bearings 61 and 62. The coupling member 7 is coupled to the rear-wheel propeller shaft.

Further, the master gear 14 includes a front extension part 14a and a rear extension part 14b which extend to the front side and the rear side, respectively, and is rotatably supported to the transfer case 51 via bearings 63 and 64.

The slave gear 15 meshing with the master gear 14 is provided on the front-wheel output shaft 13 and supported to the transfer case 51 via bearings 65 and 66. Note that the transfer case 51 has a split structure including a first case member 52, a second case member 53, and a third case member 54 arranged in this order from the front side.

The slave gear 15 is coupled to the front-wheel output shaft 13 by spline fitting. The front-wheel output shaft 13 is coupled to the front-wheel propeller shaft 50 via the universal joint 40, so that the drive force is transmittable.

The coupling 20 includes the rear-wheel output shaft 12, a drum part 21, and a plurality of friction plates 23 disposed between the rear-wheel output shaft 12 and the drum part 21 and alternately spline-fitted to the rear-wheel output shaft 12 and the drum part 21. A cover member 24 is provided at a rear-side tip end of the drum part 21 of the coupling 20. A cam mechanism 25 configured to engage the plurality of friction plates 23, and a clutch mechanism 26 configured to operate the cam mechanism 25 by externally receiving a magnetic force, are provided between the plurality of friction plates 23 and the cover member 24.

The coupling 20 further includes a solenoid 27 at the rear side of the cover member 24. Upon a power distribution control on the solenoid 27 by the control unit, the coupling 20 controls the engagement of the plurality of friction plates 23 via the clutch mechanism 26 and the cam mechanism 25. Thus, the front torque is variably controlled and extracted.

The solenoid 27 is fixed to the transfer case 51 via a cylindrical support member 28 supporting the solenoid 27, and the coupling 20 is rotatably supported at the rear side to the transfer case 51 via a bearing 29.

As illustrated in FIG. 3, the damper 30 includes an outer cylindrical member 31 forming an outer circumferential part of the damper 30, an inner cylindrical member 32 forming an inner circumferential part of the damper 30, and an elastic member 33 provided between the outer and inner cylindrical members 31 and 32 to couple them with each other.

An anti-projection member 34 configured to prevent projection of the elastic member 33, which is disposed between the outer and inner cylindrical members 31 and 32 of the damper 30, from the disposed position is provided on one side surface of the damper 30 on the coupling 20 side. At the anti-projection member 34 and an end part of the outer cylindrical member 31 of the damper 30, a snap ring 35 prevents slip-out of the anti-projection member 34 from the outer cylindrical member 31.

The damper 30 reduces a resonance frequency at which a front-wheel drivetrain resonates with a torque variation of the engine 2, to be below a practical range of the engine 2. The front-wheel drivetrain extends from the coupling 20 to the front wheels via the master gear 14, the slave gear 15, the front-wheel output shaft 13, the front-wheel propeller shaft 50, and the front-wheel differential 70.

Next, a coupling structure among the coupling 20, the damper 30, and the master gear 14, and a coupling structure between the coupling 20 and the master drive 14 are described.

The drum part 21 of the coupling 20 is provided with a cylindrical input-side coupling part 22 extending to the master gear 14 side, and the input-side coupling part 22 is coupled to the inner cylindrical member 32 of the damper 30 via a first spline-fitted section S1.

A drive force transmission member 81 is fitted to an end part of the outer cylindrical member 31 of the damper 30 on the master gear 14 by comb teeth or by spline-fitting, and slip-out of the drive force transmission member 81 from the outer cylindrical member 31 is prevented by a snap ring 82.

Further, the drive force transmission member 81 is provided, at its inner circumferential side, with a cylindrical part 81a and an output-side coupling part 81b having a cylindrical shape. The cylindrical part 81a extends toward the master gear 14 and is spline-fitted to the inner circumferential side of the rear extension part 14b constituting an input part of the master gear 14. The output-side coupling part 81b extends to the coupling 20 side and is coupled to the input-side coupling part 22, which is provided to the coupling 20, via a second spline-fitted section S2 where a relative rotation within a given angle is allowed.

Here, the first and second spline-fitted sections S1 and S2 are described in detail.

In the first spline-fitted section S1, a backlash between spline teeth 22' on an outer circumferential surface of the input-side coupling part 22 of the coupling 20 and spline teeth 32' on an inner circumferential surface of the inner cylindrical member 32 of the damper 30 is set small. Thus, the relative rotation between the coupling 20 and the inner cylindrical member 32 is zero or substantially zero.

Figure 4:
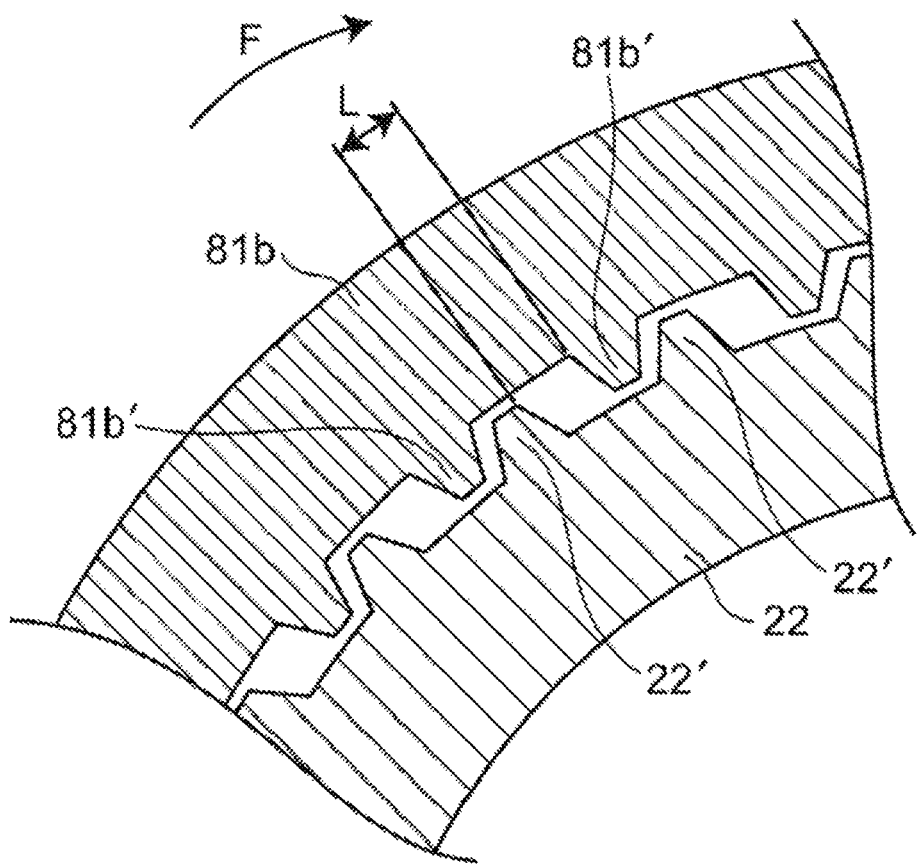
FIG. 4 is a cross-sectional view of a spline-fitted section between a coupling and a damper in an A-A cross section of FIG. 3.

On the other hand, in the second spline-fitted section S2, as illustrated in FIG. 4, a backlash between the spline teeth 22' on the outer circumferential surface of the input-side coupling part 22 of the coupling 20 and spline teeth 81b' on an inner circumferential surface of the output-side coupling part 81b of the drive force transmission member 81 is set large. Thus, the relative rotation between the coupling 20 and the drive force transmission member 81 within the given angle is allowed.

For example, the adjacent spline teeth 81b' and the adjacent spline teeth 22' have a relationship such that a large backlash L is provided between the spline tooth 81b' and the spline tooth 22' fitted to each other, on a clockwise side F of a tooth surface the spline tooth 22'. Note that the clockwise side F corresponds to a rotating direction F of the coupling 20 and the drive force transmission member 81 at the time of forward drive, which is when the torque is transmitted from the input-side coupling part 22 of the coupling 20 to the output-side coupling part 81b of the drive force transmission member 81. Thus, the output- and input-side coupling parts 81b and 22 are allowed to rotate in relation to each other within the given angle at the time of forward drive.

Note that the first and second spline-fitted sections S1 and S2, which are formed on the outer circumferential side of the input-side coupling part 22 of the coupling 20, are adjacent to each other in the axial direction of the rear-wheel output shaft 12, on the inner circumferential side of the damper 30. The spline teeth 32' of the inner cylindrical member 32 of the damper 30 and the spline teeth 81b' of the output-side coupling part 81b of the drive force transmission member are disposed to mesh with the common spline teeth 22' of the input-side coupling part 22 of the coupling 20.

With such a structure, when the front torque extracted by the coupling 20 is lower than the given value, the deformation of the elastic member 33 of the damper 30 is small and the relative rotation of the inner cylindrical member 32 to the outer cylindrical member 31 of the damper 30 is small. Therefore, in the second spline-fitted section S2 with the large backlash, the spline teeth 81b' do not meet in contact with the spline teeth 22', and the torque is not transmitted. Thus, the torque is transmitted from the coupling 20 to the master gear 14 via the first spline-fitted section S1, the damper 30, and the drive force transmission member 81.

On the other hand, when the front torque extracted by the coupling 20 is higher than the given value, the deformation of the elastic member 33 of the damper 30 is large and the relative rotation of the inner cylindrical member 32 to the outer cylindrical member 31 is large. Therefore, also in the second spline-fitted section S2 with the large backlash, the spline teeth 81b' meet in contact with the spline teeth 22', and the torque is transmitted. Thus, the torque is transmitted from the coupling 20 to the master gear 14 via the first spline-fitted section S1, the damper 30, and the drive force transmission member 81, and also via the cylindrical part 81a of the drive force transmission member 81.

Here, the second spline-fitted section S2, which is the section where the input-side coupling part 22 of the coupling 20 and the output-side coupling part 81b of the drive force transmission member 81 are spline-fitted, functions as a stopper mechanism configured to regulate the relative rotational amount of the damper 30. Thus, application of torque above the given value to the damper 30 is avoided.

Figure 6:
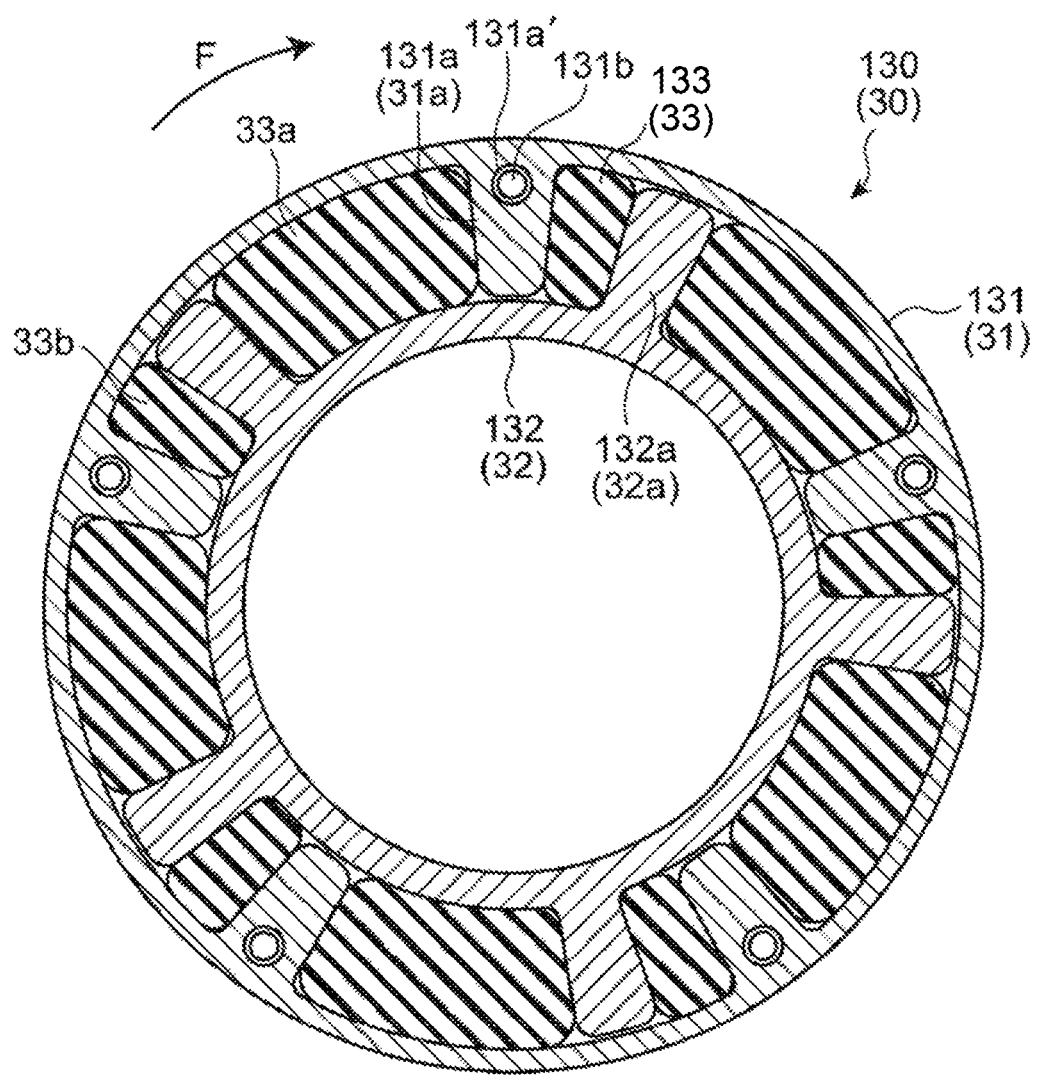
FIG. 6 is a cross-sectional view of a damper in a B-B cross section of FIG. 5.

Next, the damper structure is described more in detail by using FIG. 6 which illustrates a second embodiment.

A plurality of outer-cylindrical-side protrusions 31a are formed inwardly at an inner circumferential side of the outer cylindrical member 31 of the damper 30 at even intervals in a circumferential direction thereof. Further, a plurality of inner-cylindrical-side protrusions 32a are formed outwardly at an outer circumferential side of the inner cylindrical member 32 of the damper 30 at even intervals in a circumferential direction thereof. The protrusions 31a and 32a are located alternately to each other.

The elastic member 33 of the damper 30 is formed using an elastic material (e.g., natural rubber, synthetic rubber, etc.) and divided into first elastic members 33a and second elastic members 33b, each member being sandwiched between the adjacent protrusions 31a and 32a. Further, a rotating direction of the damper 30 at the time of forward drive, which is when the torque extracted by the coupling 20 is transmitted from the inner cylindrical member 32 toward the outer cylindrical member 31 of the damper 30 via the elastic member 33 of the damper 30, is the arrow F direction illustrated in the drawing. Each first elastic member 33a disposed on the advancing side of the inner-cylindrical-side protrusion 32a in the rotating direction at such time of the forward drive has a larger volume than that of the second elastic member 33b disposed on the reverse side of the inner-cylindrical-side protrusion 32a in the rotating direction. That is, the first elastic members 33a located on the compressed side at the time of the forward drive, which is frequently performed when the vehicle travels, is provided to have a higher vibration damping ability.

Transfer devices generally include a transmission mechanism, bearings, a spline-fitted section, etc. which require lubrication, and therefore in this embodiment, seal members 91 to 93 are provided in order to prevent leakage of the lubrication oil for lubrication of these components to the outside of the transfer device 10, electric components inside the transfer case 51, etc.

As illustrated in FIG. 3, the transfer device 10 has a first space which accommodates the transmission mechanism which requires lubrication, and a second space which accommodates the coupling 20 and the damper 30 and where electromagnetic components connected to the outside from the transfer case 51 are provided. These spaces are partitioned by the oil seal 91 which prevents leakage of the lubrication oil from the first space to the second space.

The oil seal 91 attached to the transfer case 51 is disposed on the coupling 20 side of a portion 81a' of the cylindrical part 81a of the drive force transmission member coupled to the input part 14b of the master gear. Thus, only the cylindrical part 81a of the drive force transmission member exists between the rear-wheel output shaft 12 and the oil seal 91. Therefore, the radius of a lip part 91a of the oil seal 91 in contact with the cylindrical part 81a is reduced and a sliding speed of the rear-wheel output shaft 12 on the lip part 91a is reduced. As a result, the durability of the oil seal 91 improves.

The lip seal 92 is provided between the first spline-fitted section S1 formed between the inner cylindrical member 32 of the damper 30 and the input-side coupling part 22 of the coupling 20, and the second spline-fitted section S2 formed between the output-side coupling part 81*b* of the drive force transmission member and the input-side coupling part 22 of the coupling 20. The lip seal 92 is attached to the inner cylindrical member 32 to be in contact with one side surface of the output-side coupling part 81*b* on the coupling 20 side. Thus, entrance of the lubrication oil into separate spaces on the outer circumferential side of the output-side coupling part 81*b* and the inner circumferential side of the inner cylindrical member 32 of the damper 30 is prevented. Therefore, while supplying the lubrication oil to the first spline-fitted section S1 and the second spline-fitted section S2, the entrance of the lubrication oil into the elastic member 33 of the damper 30 is prevented.

Further, an O-ring 93 is fixed to the inner cylindrical member 32 and the input-side coupling part 22 of the coupling 20 at a position on the coupling 20 side of the first spline-fitted section S1, by being sandwiched therebetween. The O-ring 93, while the lubrication oil is supplied to the first spline-fitted section S1, prevents both leakage of the lubrication oil to the elastic member 33 side and leakage of the lubrication oil toward the space where the coupling is accommodated.

In the transfer device 10 having the above structure, the output torque of the engine 2 inputted to the input shaft 11 is transmitted to the rear-wheel output shaft 12. In the two-wheel drive state, the output torque is then outputted from the rear-wheel output shaft 12 to the rear wheels alone. In the four-wheel drive state, the output torque is outputted from the rear-wheel output shaft 12 to the rear wheels and also the front torque is extracted from the output torque by the coupling 20 and outputted to the front wheels.

When the front torque extracted by the coupling 20 is below the given value, the front torque is transmitted from the coupling 20 to the master gear 14 via the damper 30. The front torque is further outputted from the master gear 14 to the front wheels via the slave gear 15, the front-wheel output shaft 13, the front-wheel propeller shaft 50, and the front-wheel differential 70.

Here, the resonance frequency at which the front-wheel drivetrain resonates with the torque variation of the engine 2 is reduced to be below the practical range of the engine 2 by the damper 30. Thus, the teeth rattling noise between gears (e.g., between the master gear 14 and the slave gear 15), which may occur when the front torque extracted by the coupling 20 is comparatively low, is reduced.

In the transfer device 10 of this embodiment, when the torque transmitted from the coupling 20 to the master gear 14 side is small, the torque is transmitted from the input-side coupling part 22, which is provided to the coupling 20, to the first spline-fitted section S1, the damper 30 and the drive force transmission member 81. When the torque is large, the angle of the relative rotation of the inner cylindrical member 32 with respect to the outer cylindrical member 31 of the damper 30 increases to bring the second spline-fitted section S2 into a torque transmittable state. A part of the torque is transmitted from the input-side coupling part 22 directly to the output-side coupling part 81*b* provided to the drive force transmission member 81 via the second spline-fitted section S2.

Thus, the second spline-fitted section S2 functions as the stopper mechanism configured to regulate the relative rotation amount of the damper 30. Therefore, the torque input higher than the given value to the damper 30 is prevented, and while the damper 30 reduces the teeth rattling noise without increasing fuel consumption, the durability of the damper 30 is secured.

Moreover, the first and second spline-fitted sections S1 and S2 are formed on the rear-wheel output shaft 12 adjacent to each other in the axial direction. Therefore, the cylindrical part 81*a* provided to the drive force transmission member 81 and coupling the outer circumferential part of the damper 30 to the master gear 14 to transmit torque from the damper 30 to the master gear 14, is disposed, in the axial direction of the drive force transmission member 81, opposite from the output-side coupling part 81*b* constituting the second spline-fitted section S2. Thus, the structure between the damper 30 and the master gear 14 is simplified. As a result, a size increase of the transfer device 10 which is caused by positions where two functions of the torque transmission from the coupling 20 and the torque transmission to the master gear 14 are exerted overlapping in the axial direction of the damper 30 is prevented, and further the transfer device 10 is downsized. Additionally, by providing the damper 30, the teeth rattling noise is reduced without increasing fuel consumption.

Second Embodiment

Figure 5:
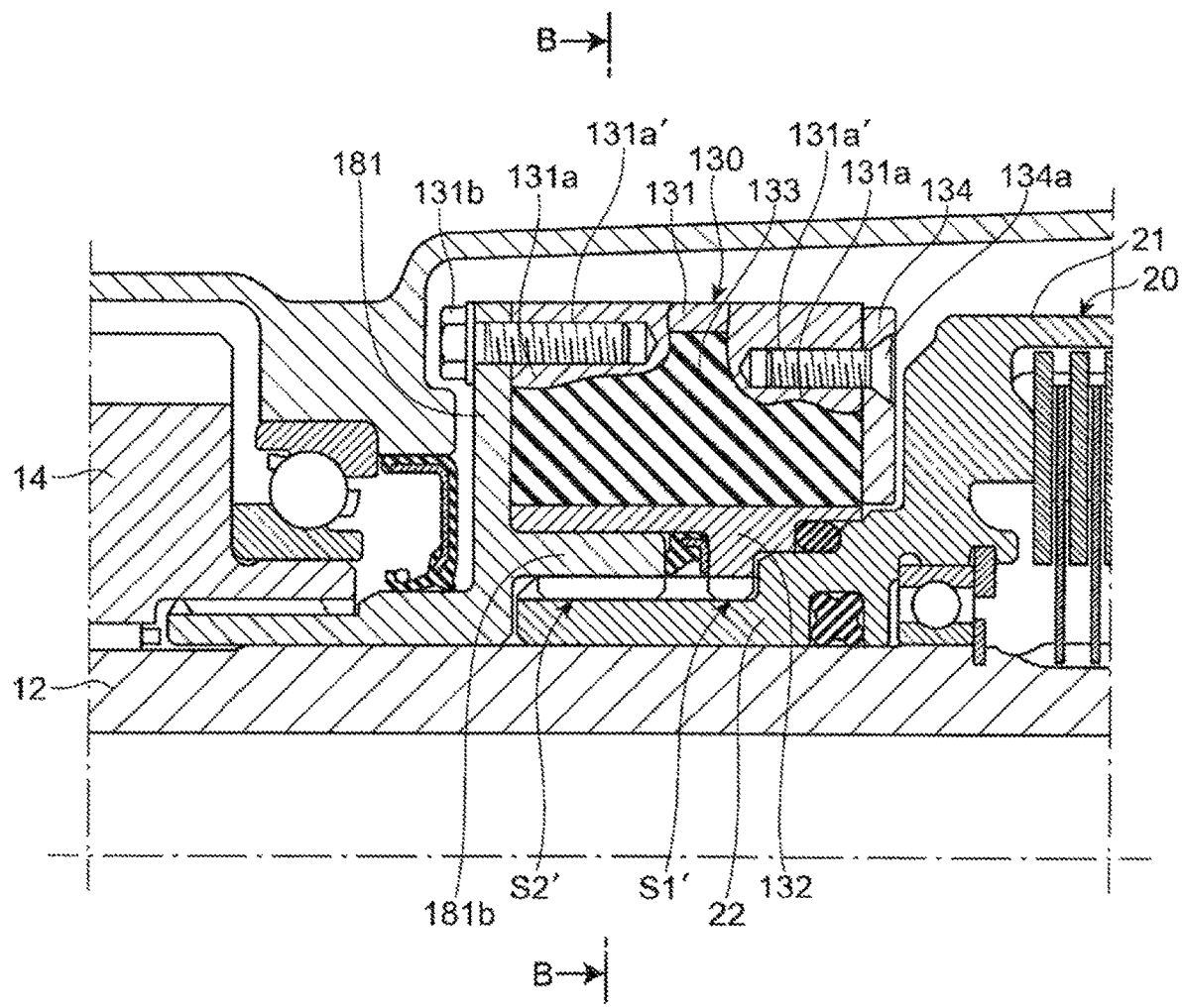
FIG. 5 is an enlarged view of a main part of a transfer device according to a second embodiment.

A transfer structure according to a second embodiment is described with reference to FIG. 5. Note that the components similar to those in the first embodiment illustrated in FIG. 3 are assigned with the same reference characters in FIG. 5, and description thereof is omitted.

In the second embodiment, a coupling structure between an outer cylindrical member 131 of a damper 130 and a drive force transmission member 181, and a coupling structure between the outer cylindrical member 131 and an anti-projection member 134 for an elastic member 133 are different from those in the first embodiment. Note that other structures and configurations are similar to those in the first embodiment, and similar effects to those in the first embodiment are obtained.

In the transfer device of the second embodiment, similar to the first embodiment, the damper 130 is provided between a coupling 20 and a transmission mechanism provided on a rear-wheel output shaft 12. Further an input-side coupling part 22 provided to the coupling 20 is coupled to an inner-cylindrical member 132 of the damper 130 via a first spline-fitted section S1'. Moreover, an output-side coupling part 181*b* provided to the drive force transmission member 181 is coupled to the input-side coupling part 22 of the coupling 20 via a second spline-fitted section S2' while allowing a relative rotation within a given angle. The drive force transmission member 181 is coupled to the outer cylindrical member 131 of the damper 130 and transmits drive force to the transmission mechanism.

Similar to the first embodiment, the first and second spline-fitted sections S1' and S2' are disposed on the rear-wheel output shaft 12 to be adjacent to each other in the axial direction thereof. Thus, a drive force transmitting structure from the damper 130 to the master gear 14, and the second spline-fitted section S2' are disposed opposite from each other in the axial direction of the drive force transmission member 181.

In the second embodiment, the drive force transmission member 181 and the anti-projection member 134 provided to one side surface of the damper 130 on the coupling 20 side and configured to prevent projection of the elastic member 133 are fastened to fastening sections 131*a*' by bolts 131*b* and 134*a*. The fastening sections 131*a*' are formed in outer-cylindrical-side protrusions 131*a* provided to the outer cylindrical member 131 of the damper 130. Further, a plurality of inner-cylindrical-side protrusions 132*a* are formed outwardly at an outer circumferential side of the inner-cylindrical member 132 of the damper 130 at even intervals in a circumferential direction thereof. The protrusions 131*a* and 132*a* are located alternately to each other.

With such a structure, similar to the first embodiment, in the transfer structure which is mounted on the four-wheel drive vehicle, the effect of preventing the size increase of the transfer device while providing the damper to reduce the teeth rattling noise without increasing fuel consumption is obtained.

Particularly in the second embodiment, rattling of the damper 130 is reduced and the damping performance is secured more reliably, compared to a case where the outer cylindrical member 131 of the damper 130 and the drive force transmission member 181 are fitted in manner of spline-fitting, comb teeth, etc. Further, since the bolts 131*b* and 134*a* are fastened to the outer-cylindrical-side protrusions 131*a* provided in the outer cylindrical member 131 of the damper 130, fastening sections dedicated for the fastening are not separately required.

Third Embodiment

A transfer structure according to a third embodiment is described with reference to FIG. 7. Note that the components similar to those in the first embodiment illustrated in FIG. 3 are assigned with the same reference characters in FIG. 7, and description thereof is omitted.

In the third embodiment, a coupling structure between an outer cylindrical member 231 of a damper 230 and a drive force transmission member 281, and structures of coupling and seal parts between a coupling 220 and the damper 230 are different from those in the first embodiment. Note that other structures and configurations are similar to those in the first embodiment, and similar effects to those in the first embodiment are obtained.

Figure 7:
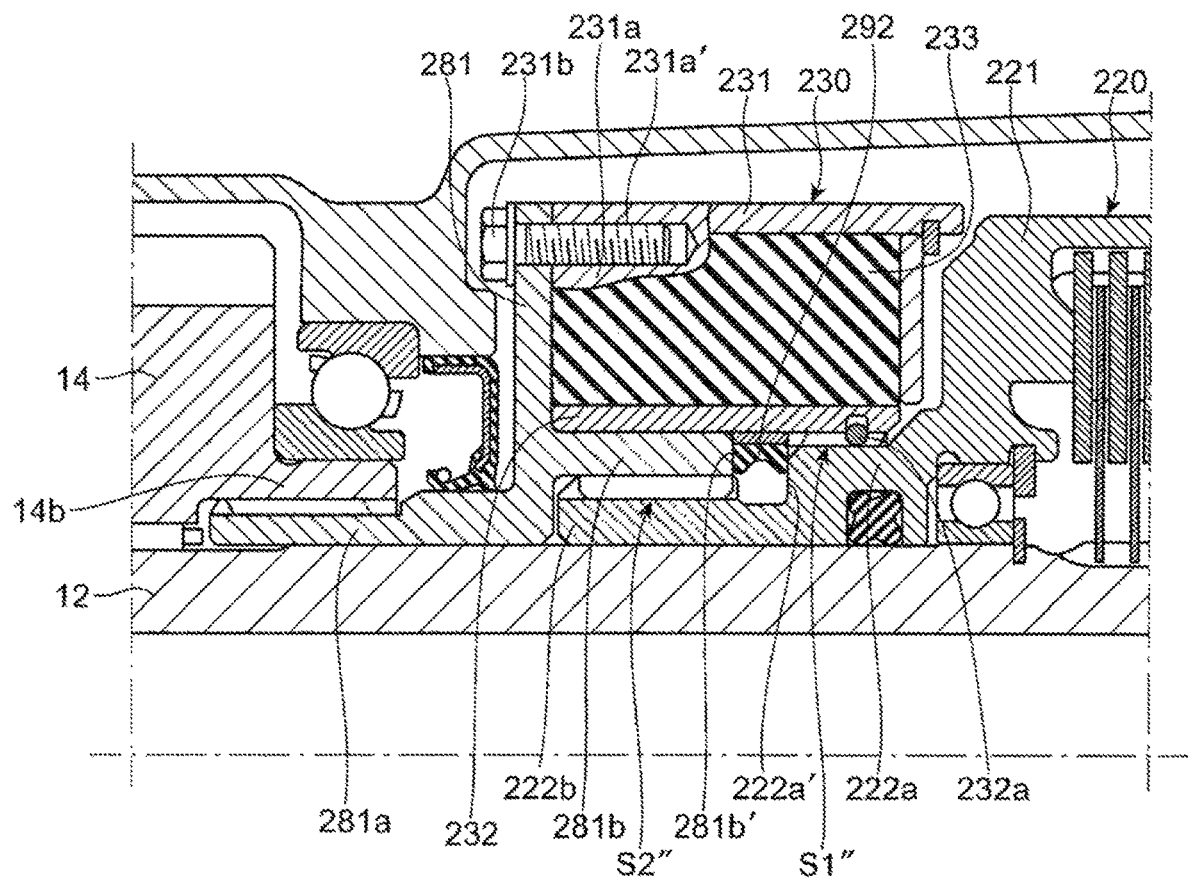
FIG. 7 is an enlarged view of a main part of a transfer device according to a third embodiment.
Figure 8:
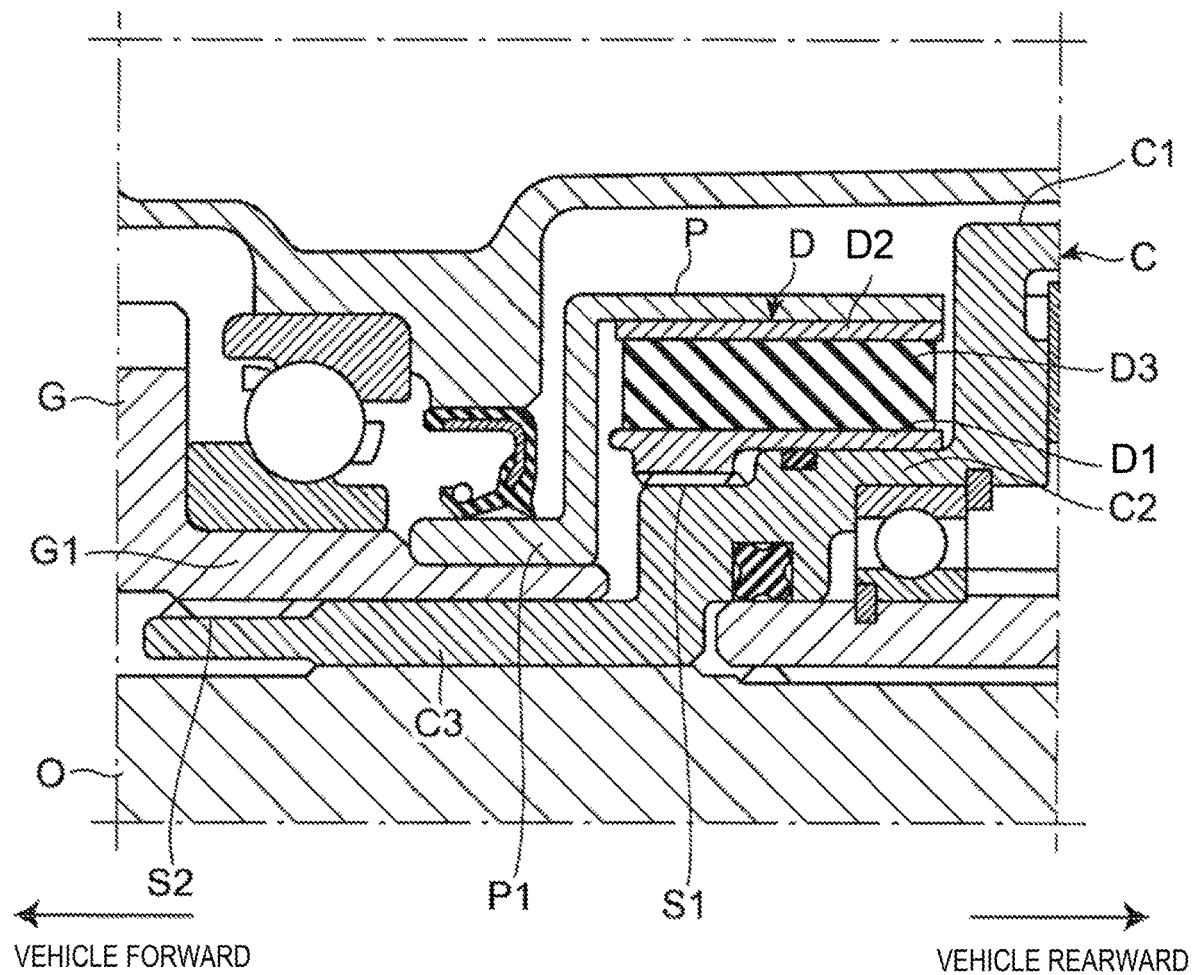
FIG. 8 is an enlarged view of a main part of the transfer device of the prior invention.

As illustrated in FIG. 7, the transfer device of the third embodiment, similar to the first embodiment, includes the damper 230 between the coupling 220 provided on a rear-wheel output shaft 12. A first input-side coupling part 222*a* extending from a drum part 221 of the coupling 220 to a master gear 14 side is coupled at its outer circumferential side to an inner cylindrical member 232 of the damper 230 via a first spline-fitted section S1". A second input-side coupling part 222*b* located on the master gear 14 side of the first input-side coupling part 222*a* of the coupling 220 and having a smaller diameter than the first input-side coupling part 222*a* is coupled to an output-side coupling part 281*b* via a second spline-fitted section S2". The output-side coupling part 281*b* extends toward the coupling 220 from the inner circumferential side of the drive force transmission member 281 coupled, by bolts 231*b*, to fastening sections 231*a*' of inward protrusions 231*a* provided in the outer cylindrical member 231 of the damper 230. Further, a cylindrical part 281*a* spline-fitted to an inner circumferential side of a rear extension part 14*b* constituting an input part of the master gear 14 is provided to extend to the master gear 14 side. Note that the first spline-fitted section S1" is provided with a snap ring 232*a* as a retainer of the damper 230 which prevents slip-out thereof from the coupling 220.

Further, a seal member 292 is attached to an inner circumferential part of the inner cylindrical member 232. The seal member 292 is provided so that both sides are in contact with a vertical wall 222*a*' of the first input-side coupling part 222*a* of the coupling 220 and a side surface 281*b*' of the output-side coupling part 281*b* of the drive force transmission member 281, respectively.

With such a structure, similar to the first embodiment, in the transfer structure which is mounted on the four-wheel drive vehicle, the size increase of the transfer device is prevented while providing the damper to reduce the teeth rattling noise without increasing fuel consumption.

Particularly in the third embodiment, while supplying the lubrication oil to the second spline-fitted section S2" which requires lubrication, the entrance of the lubrication oil into an elastic member 233 of the damper 230 from the second spline-fitted section S2" and the entrance of the lubrication oil thereto via the first spline-fitted section S1" are prevented. Further, by forming the first and second spline-fitted sections S1" and S2" at the first and second input-side coupling parts 222*a* and 222*b* of the coupling 220, respectively, seal members are put together into a single member, the damper structure is simplified, and the transfer device is downsized.

Note that the transmission mechanism of the present disclosure is not limited to that using gears, and it may be a winding mechanism. In this case, as the transmission member, a sprocket and a pulley are provided instead of the master gear and the slave gear.

The present disclosure is not limited to the above illustrative embodiments, and various enhancements and various modifications in design are made without departing from the scope of the present disclosure.

As described above, according to the present disclosure, in a transfer structure which is mounted on a four-wheel drive vehicle, a size increase of the transfer device is prevented while providing a damper to reduce the teeth rattling noise without increasing fuel consumption. Therefore, the present disclosure may suitably be used in the fields of manufacturing industries of this type of four-wheel drive vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Four-wheel Drive Vehicle
2 Engine
3 Transmission
10 Transfer Device
11 Input Shaft
12 Rear-wheel Output Shaft (Main-drive-wheel Output Shaft)
13 Front-wheel Output Shaft (Part-time-drive-wheel Output Shaft)
14 Master Gear (Driving-side Transmission Member)
14*b* Input Part
15 Slave Gear
20 Coupling
22 Input-side Coupling Part
30 Damper
31 Outer Cylindrical Member
31*a* Outer-cylindrical-side Protrusion
32 Inner Cylindrical Member
32*a* Inner-cylindrical-side Protrusion
33 Elastic Member
51 Transfer Case
81 Drive Force Transmission Member
81*a* Cylindrical Part 81*b* Output-side Coupling Part
91 Oil Seal
92 Lip Seal
93 O-ring
S1 First Spline-fitted Section
S2 Second Spline-fitted Section

What is claimed is:

1. A vehicle transfer structure, comprising:
a main-drive-wheel output shaft configured to receive torque from a drive source and output the torque to main drive wheels;
a part-time-drive-wheel output shaft provided in parallel to the main-drive-wheel output shaft;
a coupling provided on the main-drive-wheel output shaft and configured to extract a portion of the torque and output it to the part-time-drive-wheel output shaft via a transmission mechanism; and
a damper disposed on the main-drive-wheel output shaft between the coupling and the transmission mechanism, wherein
the coupling is provided with an input-side coupling part having a cylindrical shape, extending toward the transmission mechanism, and coupled to an inner circumferential part of the damper via a first spline-fitted section,
the input-side coupling part of the coupling is coupled, via a second spline-fitted section, to an output-side coupling part of a drive force transmission member coupled to an outer circumferential part of the damper and configured to transmit a drive force to a driving-side transmission member of the transmission mechanism, the output-side coupling part having a cylindrical shape and extending toward the coupling, the second spline-fitted section allowing a relative rotation between the input-side coupling part and the output-side coupling part within a given angle, and
the first and second spline-fitted sections are provided on an inner circumferential side of the damper, adjacently to each other in an axial direction of the main-drive-wheel output shaft.

2. The transfer structure of claim 1, wherein
the drive force transmission member has a cylindrical part extending toward the transmission mechanism,
a tip end portion of the cylindrical part is coupled to a cylindrical extension part provided to the driving-side transmission member of the transmission mechanism and extending toward the coupling, and
a seal member attached to a transfer case is disposed at a root end side of the cylindrical part.

3. The transfer structure of claim 1, wherein the drive force transmission member is coupled to the outer circumferential part of the damper by using a bolt.

4. The transfer structure of claim 3, wherein
an inner cylindrical member constituting the inner circumferential part of the damper is formed with an inner-cylindrical-side protrusion protruding outwardly,
an outer cylindrical member constituting the outer circumferential part of the damper is formed with an outer-cylindrical-side protrusion protruding inwardly,
an elastic member is sandwiched between the inner-cylindrical-side protrusion and the outer-cylindrical-side protrusion, and
the outer-cylindrical-side protrusion is provided with a fastening section for the bolt that couples the outer circumferential part of the damper to the drive force transmission member.

5. The transfer structure of claim 1, wherein a seal member is provided between the first and second spline-fitted sections and the inner circumferential part of the damper to prevent entrance of lubrication oil from the first and second spline-fitted sections into the damper side.

* * * * *